US008763071B2

(12) United States Patent
Sinha et al.

(10) Patent No.: US 8,763,071 B2
(45) Date of Patent: Jun. 24, 2014

(54) SYSTEMS AND METHODS FOR MOBILE APPLICATION SECURITY CLASSIFICATION AND ENFORCEMENT

(75) Inventors: Amit Sinha, San Jose, CA (US); Michael Andrew William Sutton, Reston, VA (US); Srikanth Devarajan, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 630 days.

(21) Appl. No.: 13/051,519

(22) Filed: Mar. 18, 2011

(65) Prior Publication Data

US 2011/0167474 A1    Jul. 7, 2011

Related U.S. Application Data

(63) Continuation-in-part of application No. 12/178,772, filed on Jul. 24, 2008, now Pat. No. 8,286,239.

(51) Int. Cl.
*H04L 29/06* (2006.01)

(52) U.S. Cl.
USPC .......................................................... 726/1

(58) Field of Classification Search
USPC .......................................................... 726/1
See application file for complete search history.

(56) References Cited

U.S. PATENT DOCUMENTS

| 7,702,739 | B1 | 4/2010 | Cheng et al. | |
|---|---|---|---|---|
| 8,340,633 | B1* | 12/2012 | Rege et al. | 455/406 |
| 8,473,743 | B2* | 6/2013 | Freedman et al. | 713/169 |
| 8,516,095 | B2* | 8/2013 | Eisener et al. | 709/223 |
| 2002/0069278 | A1* | 6/2002 | Forslow | 709/225 |
| 2005/0262556 | A1 | 11/2005 | Waisman et al. | |
| 2006/0095459 | A1 | 5/2006 | Adelman et al. | |
| 2006/0206571 | A1 | 9/2006 | Kuwahara | |
| 2006/0253584 | A1 | 11/2006 | Dixon et al. | |
| 2007/0130350 | A1 | 6/2007 | Alperovitch et al. | |
| 2008/0082662 | A1* | 4/2008 | Dandliker et al. | 709/225 |
| 2008/0160969 | A1 | 7/2008 | Tromm | |
| 2008/0172382 | A1 | 7/2008 | Prettejohn | |
| 2009/0036111 | A1* | 2/2009 | Danford et al. | 455/419 |
| 2009/0228950 | A1 | 9/2009 | Reed et al. | |
| 2010/0318642 | A1* | 12/2010 | Dozier | 709/223 |
| 2011/0231899 | A1* | 9/2011 | Pulier et al. | 726/1 |
| 2012/0185913 | A1* | 7/2012 | Martinez et al. | 726/1 |

OTHER PUBLICATIONS

Michael Sutton; Information Disclosure Statement to USPTO; Mar. 10, 2009.

(Continued)

*Primary Examiner* — Michael S McNally
(74) *Attorney, Agent, or Firm* — Clements Bernard PLLC; Lawrence A. Baratta, Jr.; Christopher L. Bernard

(57) ABSTRACT

The present disclosure provides systems and methods for mobile application security classification and enforcement. In particular, the present invention includes a method, a mobile device, and a distributed security system (e.g., a "cloud") that is utilized to enforce security on mobile devices communicatively coupled to external networks (i.e., the Internet). Advantageously, the present invention is platform independent allowing it to operate with any current or emerging mobile device. Specifically, preventing malicious applications from running on an end user's mobile device is challenging with potentially millions of applications and billions of user devices; the only effective way to enforce application security is through the network that applications use to communicate.

15 Claims, 11 Drawing Sheets

(56) References Cited

OTHER PUBLICATIONS

Scott Thurm and Yukari Iwatani Kane; :Your Apps Are Watching You; Global Compliance Symposium; The Wall Street Journal—Technology—Dec. 18, 2010.

Sara Yin; "'Most Sophisticated' Android Trojan Surfaces in China"—Article Date 12:30:10; PC PCMAG.COM.

Katherine Noyes; Techworld—Android Browser Vulnerability Exposes User Data—How to protect your Android smartphone from attacks; PC World—Published: 10:46 GMT, Nov. 25, 2010.

* cited by examiner

| RISK IDENTIFIER | VALUE | SCALING FACTOR | TOTAL WRI SCORE CONTRIBUTION |
|---|---|---|---|
| DOMAIN NAME IN BLACK LIST | +4 | 1.5 | +6 |
| RECENT DOMAIN NAME REGISTRATION (E.G. WITHIN PAST 3 DAYS) | +3 | 1 | +3 |
| ZERO PIXEL IFRAME | +5 | 1 | +5 |
| VALID SSL CERTIFICATE | -5 | 1 | -5 |
| | | | WRI SCORE 9 |

SYSTEMS AND METHODS FOR MOBILE APPLICATION SECURITY CLASSIFICATION AND ENFORCEMENT

CROSS-REFERENCE TO RELATED APPLICATION(S)

This application is a continuation-in-part of U.S. patent application Ser. No. 12/178,772 filed Jul. 24, 2008, now U.S. Pat. No. 8,286,239 and entitled "IDENTIFYING AND MANAGING WEB RISKS," the contents of which are incorporated in full by reference herein.

FIELD OF THE INVENTION

The present invention relates generally to computer security systems and methods. More particularly, the present invention relates to systems and methods for mobile application security classification and enforcement.

BACKGROUND OF THE INVENTION

Mobile device adoption is poised to overtake conventional computers (laptops, desktops, etc.). Mobile devices may include smart phones, cell phones, personal digital assistants, netbooks, tablet devices, and the like. With the proliferation of mobile devices and their associated operating systems and applications, mobile security poses significant threat to enterprises, service providers, and the like. That is, enterprises are struggling with the consumerization of Information Technology (IT). With the proliferation of mobile devices within the enterprise, IT administrators can no longer ignore these devices as outside their scope of responsibility. Further, computing power on these devices is now as powerful as laptops. Users may access corporate data and the Internet through wireless networks such as Wi-Fi hotspots or cellular 3G/4G that are not controlled by IT. With many corporate applications being hosted in the cloud, the risk is even higher. Ensuring the security of corporate data is no longer a matter of deploying adequate measures within the organization. It is imperative that security and policy travel with users wherever they are, on whatever type of device they use. Unlike the personal computer (PC) world that is dominated by a few main operating systems, the number of platforms and device form-factors for mobile devices is much higher, as is their churn rate. IT needs a solution that is easy to deploy, supports multiple mobile platforms and provides consistent user policy enforcement across PCs and mobile devices.

There are two primary challenges that affect IT organizations as the proliferation and adoption of mobile devices increases with enterprises. The first challenge is that the line between enterprise and personal usage is getting blurred on mobile devices. These devices run the gamut of applications, from Facebook, YouTube, Pandora, to enterprise apps like email and sales force automation. Since the enterprise typically does not own the device, enforcing policies for acceptable usage or installing application controls like a traditional IT administrator would on a corporate PC is often not viable. There is an increased risk of exposing corporate data on mobile devices since they roam and connect to multiple Wi-Fi and cellular 3G/4G networks. Traditionally, web security protections have been enforced either by way of a gateway web proxy at an enterprise's egress to the Internet or via signature-based anti-virus protections installed on the user PC. With mobile devices, there is no obvious point of enforcement like an enterprise proxy. To complicate matters further, enterprise data is rapidly migrating to the cloud. As a result, an employee's mobile web transactions may never hit the enterprise network while accessing critical cloud-hosted data.

The second challenge is that security apps for mobile devices are expensive to develop and often ineffective. Unlike the PC world, which is dominated by Microsoft, there are several different mobile operating systems—Apple iOS, Android, Windows Mobile, Blackberry, Symbian, etc. Each platform has its own software development environment and a security vendor developing mobile security applications will have to replicate the effort across various platforms. Further, some platforms such as Apple iOS do not allow traditional anti-virus applications on their platform. Loading third party applications, not approved by the platform vendor may lead to violation of contract and often requires "jail-breaking" the device—definitely not an enterprise option. Even if security applications are allowed, they are a headache to deploy, require constant updates, and are easy to circumvent—the user can simply uninstall them if they dislike it. Worst of all, they impact device performance and degrade user experience by stretching the already limited processor and memory resources on the mobile device.

With the advent of mobile devices, there has been an explosion of custom built applications that users can download from various mobile markets such as the Apple App Store and the Android Market. The Apple App Store has over 250,000 apps and recently crossed the 10 Billion download mark. The Android Market is close behind. Needless to say, mobile application stores' download revenue is experiencing exponential growth. While some platforms force developers to get their apps approved by the platform owner (e.g. Apple), others do not. Regardless, with the explosion of apps, several security and privacy concerns have emerged. Exemplary security concerns include Google removing banking applications from the Android market for a while last year because a hacker posted fake banking apps to harvest username and passwords. In December 2010, the Wall Street Journal provided a detailed analysis of popular apps that were leaking private user information (location, contact information, subscriber IDs, user credentials, etc.) to third party sources, often without the knowledge of the user. Furthermore, sophisticated botnet type Trojans are beginning to emerge for mobile platforms. This, coupled with the fact that browsers running on mobile devices are as capable as PC based browsers running Javascript and HTML5. Mobile platforms are even more desirable targets for web based exploits given that the devices are always accessible and online and thus more likely to be impacted by a short lived attack.

BRIEF SUMMARY OF THE INVENTION

In an exemplary embodiment, a method includes configuring a mobile device such that the mobile device communicates data to an external network via a cloud-based security system; receiving data from the mobile device; enforcing policy on the data from the mobile device; and based on the policy, forwarding the data to the external network. The method may further include receiving data from the external network; inspecting content of the data from the external network; and based on the inspecting content, forwarding the data to the mobile device. The method may further include determining a plurality of attributes for each of a plurality of applications for the mobile device; storing the plurality of attributes for each of the plurality of applications in a database; and periodically updating the database. The method may further include utilizing the database in the enforcing policy step. The determining the plurality of attributes may include determining a security score based on a plurality of factors related to security; and determining a privacy score based on a plurality of factors related to privacy. The method may further include utilizing the database in the enforcing policy step to prevent the data from the mobile device from being forwarding if the data relates to an application which does not meet a minimum threshold related to the security score and the privacy score. The method may further include for a particular application, updating the plurality of attributes based on feedback from the cloud-based security system.

The method may further include determining a web risk index based on either the data from the mobile device or the data from the external network; and based on the web risk index, forwarding the data from the mobile device to the external network or forwarding the data from the external network to the mobile device. The method may further include pushing a configuration to the mobile device prior to the configuring step. The configuring step may include setting the mobile device such that data to and from the mobile device is interfaced through the cloud-based security system. The mobile device may be configured with a Hypertext Transfer Protocol proxy designating the cloud-based security system. Alternatively, the mobile device may be configured with a Virtual Private Network to the cloud-based security system. The inspecting content step may include analyzing the data from the external network for malicious content. The malicious content may include viruses, spyware, malware, Trojans, botnets, spam email, phishing content, inappropriate content with respect to policy, black listed content, and combinations thereof.

In another exemplary embodiment, a network security system may include a processing node communicatively coupled to a mobile device and to an external network, wherein the processing node includes a data store storing security policy data for the mobile device, data inspection engines configured to perform threat detection classification on content to the mobile device from the external network, and a manager communicatively coupled to the data store and the data inspection engines; wherein the processing node is configured to enforce policy between the mobile device and the external network and inspect content from the external network to the mobile device. The network security system may further include an authority node communicatively coupled to the processing node, wherein the authority node may include a data store storing security policy data for the processing node and a plurality of other processing nodes; wherein the authority node is configured to maintain a database of application ratings for a plurality of applications associated with the mobile device, and wherein the database is utilized by the processing node to enforce the policy and to inspect the content. Optionally, the mobile device is configured with a Hypertext Transfer Protocol proxy designating the processing node. Alternatively, the mobile device is configured with a Virtual Private Network to the processing node.

In yet another exemplary embodiment, a mobile device includes a data store; a network interface communicatively coupled to a network; a processor, wherein the data store, the network interface, and the processor are communicatively coupled there between and configured to: transmit data to a cloud-based security system configured to enforce policy on the data from the mobile device; and receive data from the cloud-based security system configured to inspect content on the data to the mobile device for malicious content. The mobile device may be communicatively coupled to the cloud-based security system via one of a wireless service provider network, a wireless hot spot, or a wired network.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides systems and methods for mobile application security classification and enforcement. In particular, the present invention includes a method, a mobile device, and a distributed security system (e.g., a "cloud") that is utilized to enforce security on mobile devices communicatively coupled to external networks (i.e., the Internet). Advantageously, the present invention is platform independent allowing it to operate with any current or emerging mobile device. Specifically, preventing malicious applications from running on an end user's mobile device is challenging with potentially millions of applications and billions of user devices; the only effective way to enforce application security is through the network that applications use to communicate.

Figure 1:
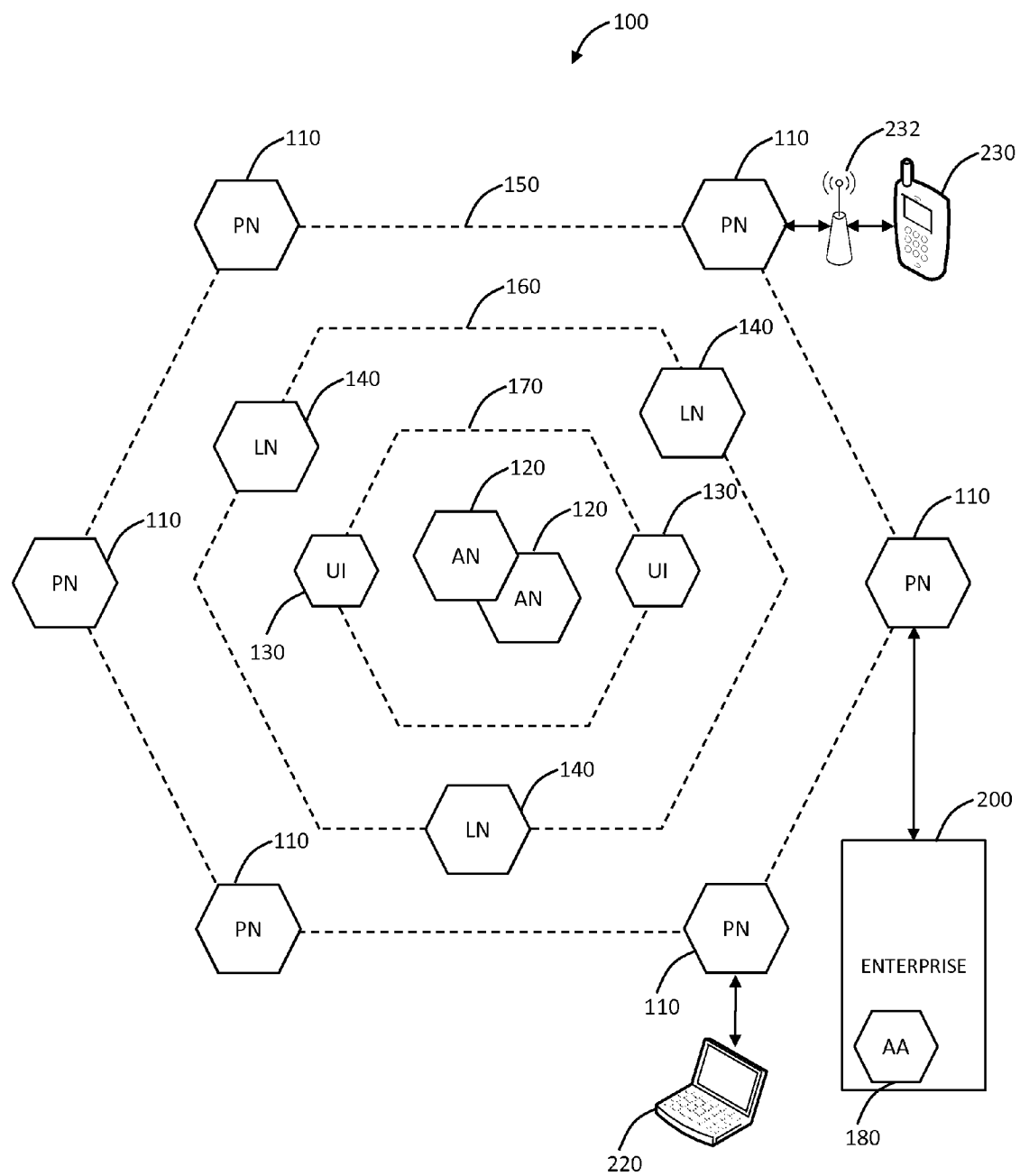
FIG. 1 is a block diagram of a distributed security system which may be utilized for mobile device security and policy enforcement of the present invention.

Referring to FIG. 1, in an exemplary embodiment, a block diagram illustrates of a distributed security system 100. The system 100 may, for example, be implemented as an overlay network in a wide area network (WAN), such as the Internet, a local area network (LAN), or the like. The system 100 includes content processing nodes, PN 110, that proactively detect and preclude the distribution of security threats, e.g., malware, spyware, viruses, email spam, etc., and other undesirable content sent from or requested by an external system. Example external systems can include an enterprise 200, a computer device 220, and a mobile device 230, or other network and computing systems communicatively coupled to the system 100. In an exemplary embodiment, each of the processing nodes 110 may include a decision system, e.g., data inspection engines that operate on a content item, e.g., a web page, a file, an email message, or some other data or data communication that is sent from or requested by one of the external systems. In an exemplary embodiment, all data destined for or received from the Internet is processed through one of the processing nodes 110. In another exemplary embodiment, specific data specified by each external system, e.g., only email, only executable files, etc., is process through one of the processing node 110.

Each of the processing nodes 110 may generate a decision vector D=[d1, d2, ..., dn] for a content item of one or more parts C=[c1, c2, ..., cm]. Each decision vector may identify a threat classification, e.g., clean, spyware, malware, undesirable content, innocuous, spam email, unknown, etc. For example, the output of each element of the decision vector D may be based on the output of one or more data inspection engines. In an exemplary embodiment, the threat classification may be reduced to a subset of categories e.g., violating, non-violating, neutral, unknown. Based on the subset classification, the processing node 110 may allow distribution of the content item, preclude distribution of the content item, allow distribution of the content item after a cleaning process, or perform threat detection on the content item. In an exemplary embodiment, the actions taken by one of the processing nodes 110 may be determinative on the threat classification of the content item and on a security policy of the external system to which the content item is being sent from or from which the content item is being requested by. A content item is violating if, for any part C=[c1, c2, ..., cm] of the content item, at any of the processing nodes 110, any one of the data inspection engines generates an output that results in a classification of "violating."

Figure 3:
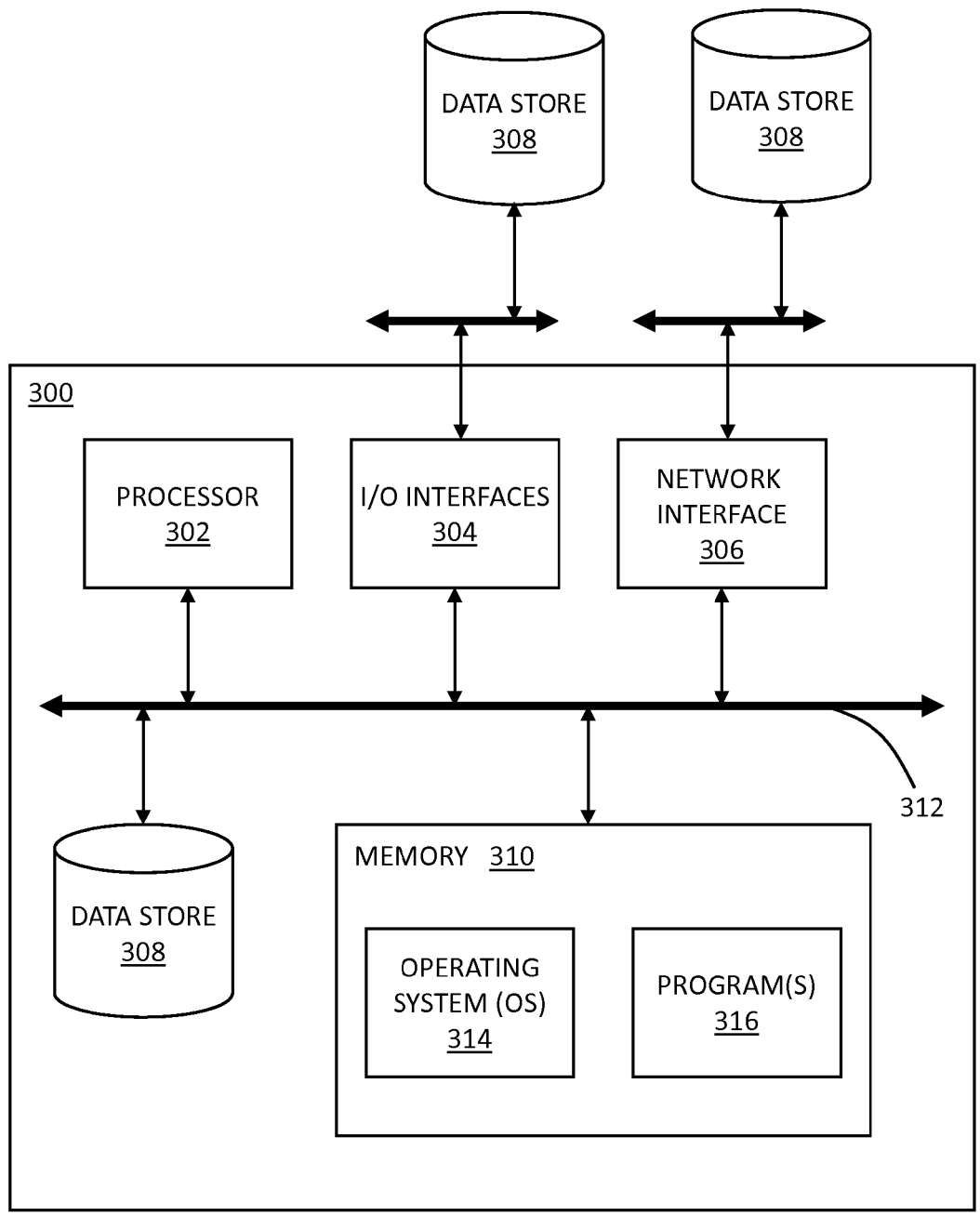
FIG. 3 is a block diagram of a server which may be used in the distributed security system of FIG. 1 or standalone

Each of the processing nodes 110 may be implemented by one or more of computer and communication devices, e.g., server computers, gateways, switches, etc, such as the server 300 described in FIG. 3. In an exemplary embodiment, the processing nodes 110 may serve as an access layer 150. The access layer 150 may, for example, provide external system access to the security system 100. In an exemplary embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc may be configured to establish communications through the nearest (in traffic communication time) processing node 110. A mobile device 230 may be configured to communicated to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an exemplary embodiment, the processing nodes 110 may communicate with one or more authority nodes (AN) 120. The authority nodes 120 may store policy data for each external system and may distribute the policy data to each of the processing nodes 110. The policy may can, for example, define security policies for a protected system, e.g., security policies for the enterprise 200. Example policy data may define access privileges for users, web sites and/or content that is disallowed, restricted domains, etc. The authority nodes 120 may distribute the policy data to the access nodes 110. In an exemplary embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may implemented by push and pull distribution schemes described in more detail below. In an exemplary embodiment, each of the authority nodes 120 may be implemented by one or more computer and communication devices, e.g., server computers, gateways, switches, etc., such as the server 300 described in FIG. 3. In some exemplary embodiments, the authority nodes 110 may serve as an application layer 160. The application layer 160 may, for example, manage and provide policy data, threat data, and data inspection engines and dictionaries for the processing nodes 110.

Other application layer functions may also be provided in the application layer 170, such as a user interface (UI) frontend 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an exemplary embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another exemplary embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used.

In an exemplary embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an exemplary embodiment, the processing node 110 may act as a forward proxy that receives user requests to external servers addressed directly to the processing node 110. In another exemplary embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an exemplary embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), or other IP security protocols may be used. In another exemplary embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise the access agent 180 may be configured to perform MPLS labeling. In another transparent proxy mode exemplary embodiment, a protected system, such as the enterprise 200, may identify the processing node 110 as a next hop router for communication with the external servers.

Figure 2:
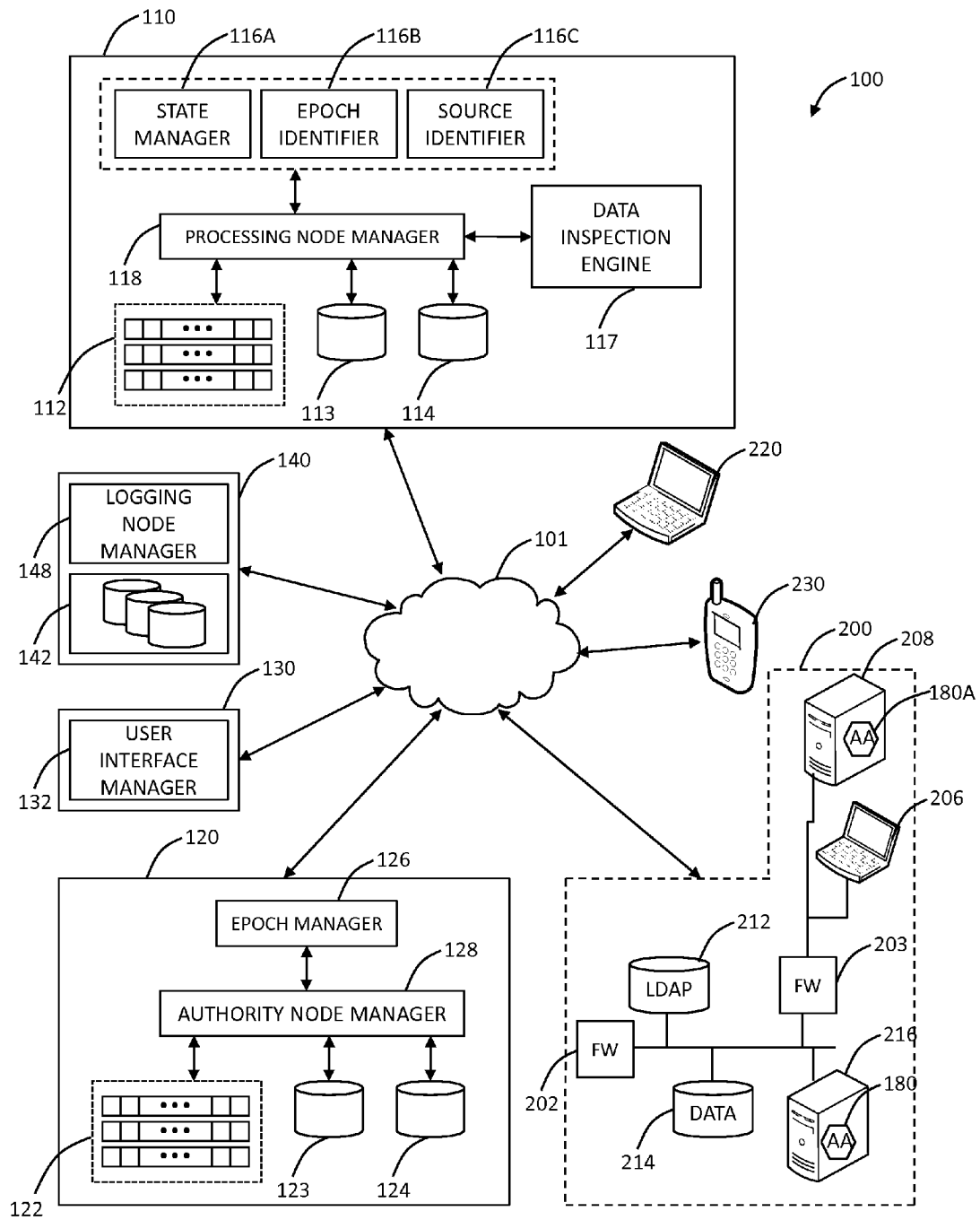
FIG. 2 is a block diagram of the distributed security system of FIG. 1 illustrating various components in more detail.

Referring to FIG. 2, in an exemplary embodiment, a block diagram illustrates various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight director access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include a user identifiers, login passwords, and a login history associated with each user identifier. The other data stores 214 may include sensitive information, such as bank records, medical records, trade secret information, or any other information warranting protection by one or more security measures.

In an exemplary embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another exemplary embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

In an exemplary embodiment, the processing nodes 110 are external to network edges of the external systems 200, 220 and 230. Each of the processing nodes 110 stores security policies 113 received from the authority node 120 and monitors content items requested by or sent from the external systems 200, 220 and 230. In an exemplary embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to further validate the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, absence of information, while a one in that bit position can indicate presence of information. Alternatively, a one could be used to represent absence, and a zero to represent presence. Each content item may have an information key that is hashed. For example, the processing node manager 118 may identify the URL address of a URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst case additional cost is only on the order of one, and thus its use for most failure queries saves on the order of m log m, where m is the number of information records present in the threat data 114.

The detection processing filter 112 thus improves performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst case null lookup operation into the threat data 114 is avoided, and a threat detection can be implemented immediately. The detection processing filter 112 thus complements the threat data 114 that capture positive information. In an exemplary embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position and that bit position indicates that the requested information is absent when it is actually present.

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from a processing nodes 110 when the processing node 110 has processed a content item and update the master detection processing filter 122. For example, the master detection processing filter 122 may be distributed to the processing nodes 110, which then store a local copy of the detection processing filter 112.

In an exemplary embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an exemplary embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another exemplary embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120.

The authority node manager 128, in response to receiving the threat data update, updates the master threat data 124 stored in the authority node data store according to the threat data update received from the processing node 110. In an exemplary embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined to not be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an exemplary embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are exemplary processes for which the threat data and/or detection process filters may be updated in the system 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a computer readable medium. Other processing architectures can also be used, e.g., a combination of specially designed hardware and software, for example.

Referring to FIG. 3, in an exemplary embodiment, a block diagram illustrates a server 300 which may be used in the system 100 or standalone. Any of the processing nodes 110, the authority nodes 120, and the logging nodes 140 may be formed through one or more servers 300. Further, the computer device 220, the mobile device 230, the servers 208, 216, etc. may include the server 300. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 can include, for example, a serial port, a parallel port, a small computer system interface (SCSI), an infrared (IR) interface, a radio frequency (RF) interface, and/or a universal serial bus (USB) interface.

The network interface 306 may be used to enable the server 300 to communicate on a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The operating system 314 may be any of Windows NT, Windows 2000, Windows XP, Windows Vista, Windows 7, Windows Server 2003/2008 (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), Android and variants thereof (available from Google, Inc. of Mountain View, Calif.), or the like. The one or more programs 316 may be configured to implement the various processes, algorithms, methods, techniques, etc. described herein.

Figure 4:
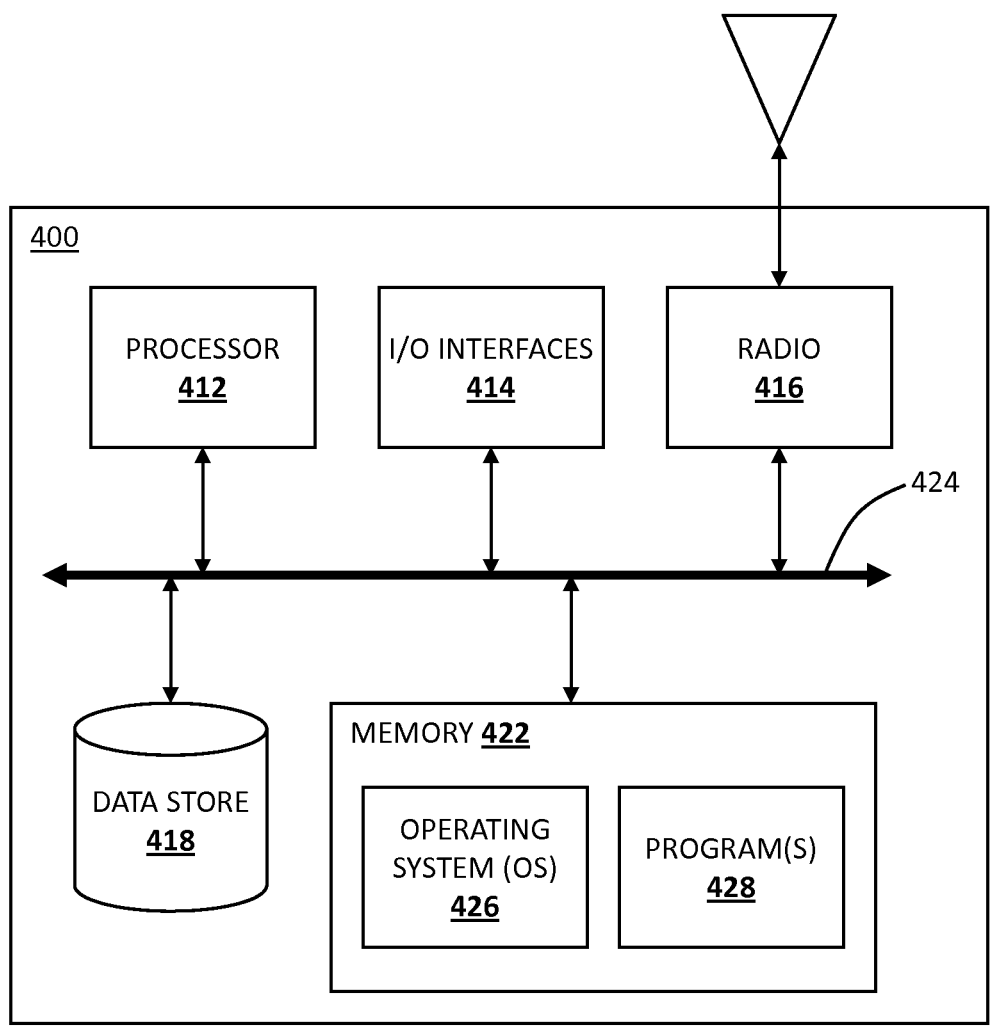
FIG. 4 is a block diagram of a mobile device which may be used in the system of FIG. 1 or with any other cloud-based system.

Referring to FIG. 4, in an exemplary embodiment, a block diagram illustrates a mobile device 400, which may be used in the system 100 or the like. The mobile device 400 can be a digital device that, in terms of hardware architecture, generally includes a processor 412, input/output (I/O) interfaces 414, a radio 416, a data store 418, and memory 422. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (412, 414, 416, 418, and 422) are communicatively coupled via a local interface 424. The local interface 424 can be, for example but not limited to, one or more buses or other wired or wireless connections, as is known in the art. The local interface 424 can have additional elements, which are omitted for simplicity, such as controllers, buffers (caches), drivers, repeaters, and receivers, among many others, to enable communications. Further, the local interface 424 may include address, control, and/or data connections to enable appropriate communications among the aforementioned components.

The processor 412 is a hardware device for executing software instructions. The processor 412 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 412 is configured to execute software stored within the memory 422, to communicate data to and from the memory 422, and to generally control operations of the mobile device 410 pursuant to the software instructions. In an exemplary embodiment, the processor 412 may include a mobile optimized processor such as optimized for power consumption and mobile applications. The I/O interfaces 414 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 414 can also include, for example, a serial port, a parallel port, a small computer system interface (SCSI), an infrared (IR) interface, a radio frequency (RF) interface, a universal serial bus (USB) interface, and the like. The I/O interfaces 414 can include a graphical user interface (GUI) that enables a user to interact with the mobile device 410. Additionally, the I/O interfaces 414 may further include an imaging device, i.e. camera, video camera, etc.

The radio 416 enables wireless communication to an external access device or network. Any number of suitable wireless data communication protocols, techniques, or methodologies can be supported by the radio 416, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols; wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 418 may be used to store data. The data store 418 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 418 may incorporate electronic, magnetic, optical, and/or other types of storage media.

The memory 422 may include any of volatile memory elements (e.g., random access memory (RAM, such as DRAM, SRAM, etc.)), nonvolatile memory elements (e.g., ROM, hard drive, tape, CDROM, etc.), and combinations thereof. Moreover, the memory 422 may incorporate electronic, magnetic, optical, and/or other types of storage media. Note that the memory 422 may have a distributed architecture, where various components are situated remotely from one another, but can be accessed by the processor 412. The software in memory 422 can include one or more software programs, each of which includes an ordered listing of executable instructions for implementing logical functions. In the example of FIG. 4, the software in the memory system 422 includes a suitable operating system (O/S) 426 and programs 428. The operating system 426 essentially controls the execution of other computer programs, and provides scheduling, input-output control, file and data management, memory management, and communication control and related services. The operating system 426 may be any of LINUX (or another UNIX variant), Android (available from Google), Symbian OS, Microsoft Windows CE, Microsoft Windows 7 Mobile, iOS (available from Apple, Inc.), webOS, Blackberry OS, and the like. The programs 428 may include various applications, add-ons, etc. configured to provide end user functionality with the mobile device 400. For example, exemplary programs 428 may include, but not limited to, a web browser, social networking applications, streaming media applications, games, mapping and GPS applications, electronic mail applications, financial applications, and the like. In a typical example, the end user typically uses one or more of the programs 428 along with a network such as the system 100.

Figures 5, 6:
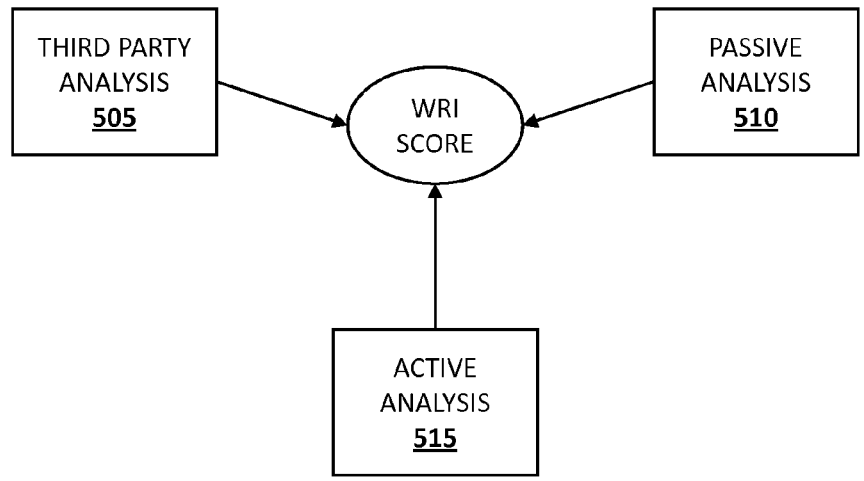
FIG. 5 is a diagram of a web risk index (WRI) score based on a comprehensive weighting of a variety of risk indicators identified by three separate analysis categories.
FIG. 6 is an illustrative example of a WRI score calculation is represented by a table.

Referring to FIG. 5, in an exemplary embodiment, a web risk index (WRI) score is based on a comprehensive weighting of a variety of risk indicators identified by three separate analysis categories: third party analysis 505, passive analysis 510, and active analysis 515. WRI scores may be calculated in real-time by a web risk service for all requests and responses. The WRI scores may then be leveraged to implement security policies by blocking or logging those requests which exceed a given and customizable risk threshold. Risk indicators calculated for past WRI score calculations may be leveraged for subsequent requests, thus limiting the processing required to calculate individual WRI scores for each request. For instance, past WRI scores and previously retrieved risk indicators could also be shared among entities, further increasing performance and accuracy. The various risk indicators for a web request may be drawn from up to three separate control categories, where each category is defined based upon the source of the risk information obtained. The first category, third party analysis 505, identifies web risk information obtained from a source other than the destination of the web request that will be scored by a processing node. This could include, for instance, third party blacklists or other data sources containing information about the destination of a web request. The second category, passive analysis 510, identifies risk information contained in the original web request query or web response(s). The third category, active analysis 515, identifies web risk information based on one or more separate queries to the destination of the web request that is to be scored. The additional query/queries are unique and are designed to solicit a different response in order to identify separate risk information.

In an exemplary embodiment, the systems described herein the FIGS. 1-4 may be configured to calculate a web risk index score associated with all web requests and responses that pass through one of the processing nodes 110. The web risk index score for a given web request is compared against one or more previously established threshold values in order to determine how the request should be handled. For example, the request could be permitted, blocked, permitted but provide a user warning message, or permitted but logged for later analysis. For example, these processes are performed by a web risk service that can be implemented, for instance, at the processing nodes 110. The processing nodes 110 responsible for calculating risk scores can also be leveraged to impose restrictions on web requests based on calculated web risk index scores. This permits complete inspection of all data to and from a given resource. The present invention utilizes the term "web request" but those of ordinary skill in the art will recognize with respect to mobile devices, such request may include any data request over a wireless network.

A variety of sources may be leveraged for the third party analysis 505 including datasets of known malicious sites (i.e. black lists) or datasets containing factual data unrelated to the malicious nature of a site can provide insight into the potential of increased risk at a given site. The existence of sites in such lists may therefore be web risk indicators that can impact the WRI score of a web request or response. Black lists, which are lists of web based resources that are known to be malicious, may be used for the third party analysis 505. Black lists may take the form of domain names, fully qualified domain names, IP addresses, Uniform Resource Locators (URLs), or any other format, which uniquely identify a web-based resource. Black lists may also include string based search patterns, such as regular expressions. The existence or absence of the request in a given black list can contribute to the WRI score. Black lists may be available as free or commercial services. A first example of black lists is phishing archives, which are lists of web sites hosting pages set up for the purpose of phishing activities. Examples of such archives include the Google Safe Browsing API, PhishTank API or Netcraft Phishing Site Feed. A second example of black lists are Autonomous System Number Archives (ASN) identifying malicious sources. An ASN is a number used to identify a collection of IP networks and routers under the control of a single entity, and black lists can identify ASNs which are known to be the source of malicious activity.

Another resource that can be used in the third party analysis 505 are WHOIS queries, which may be leveraged to identify registration information for a given domain name. If the WHOIS records for the domain name of a query correspond to the WHOIS records of a previous query for which the WRI score, or a portion of the WRI score attributable to the domain name, was above an acceptable threshold, this can serve to increase the WRI score of a current web request. This is based on the proposition that the WHOIS records suggest that the same individual or group is responsible for managing both domains. Because at least one is known or suspected to be malicious, the second domain is also suspected of being malicious because it is likely to be managed by the same individual or group. Recent domain name registrations may be another factor used in the third party analysis 505. Because attackers often register new domain names for the purposes of conducting a specific attack and discontinue use of the site in a short time period, a request sent to sites with recently registered domain names can results in a higher WRI score.

Yet another resource may can be used in the third party analysis 505 is past results. It is common for attackers to house multiple attacks on the same server. Therefore, if an otherwise innocuous resource is requested from a server for which the WRI score (or a portion of the WRI score attributable to the server) has been above an acceptable threshold, this can result in an increase in the WRI score of subsequent requests. Referencing Autonomous System Numbers or Classless Inter Domain (CIDR) blocks could also extend this approach to blocks of IP addresses owned or managed by the same entity. On-Line Discussion Forums may also be leveraged for the third party analysis 505. For instance, on-line discussion forums may contain information regarding web sites/pages known to be vulnerable to attack. The content of such forums could regularly be parsed to identify vulnerable sites, and the existence of a web site in such a forum could serve to increase the WRI score for a request to such a site.

The third party analysis 505 may also leverage the use of binary search engines that permit searches to identify the existence of binary files hosted on web sites. An example of such a search engine is the beta Google Binary Search engine, which allows for example, searching for values within the Portable Executable (PE) header of Windows based binary files. Once known malicious code samples are obtained, characteristics of the files could be identified and binary search engines could then be leveraged to identify web sites hosting such files. The existence of known malicious code being hosted on a web site could increase the WRI score for a web request. The various third party analysis 505 methods and datasets provided above are example variables that can be components of the overall computation of a WRI score, but still other methods and datasets can also be used.

The passive analysis 510 refers to an in-line analysis of the original request/response made by an end user computer in real time. Such requests may be reviewed for web risk indicators that can affect the WRI score for a web request or response. Examining for obfuscated code in the response body is a first form of the passive analysis 510. In particular, client side code (e.g. HTML, JavaScript, etc.) can be obfuscated using a variety of methods so that it is not human readable when viewing the page source code without first decoding the data. While there are legitimate reasons for obfuscating client side code, it does not provide a high level security and is commonly employed by malicious sites (i.e. phishing sites, botnets, etc.) as a simple means of avoiding detection. Therefore, the existence of obfuscated code, when not deemed to be employed for a legitimate reason, can serve to raise the WRI score.

Identifying web requests seeking to leverage client side vulnerabilities is another method of the passive analysis 510. A variety of web-based attacks are designed to target end users when making requests to malicious web pages. Such attacks may target vulnerabilities in the web browsers used, employ social engineering to convince the end user to perform an action that will lead to a compromise or combine the two approaches. Examples of attacks involving social engineering would include cross-site scripting (XSS) and cross-site request forgery (CSRF) for which the victim must be convinced to send a specific web request. Inspection of the web request/response traffic in real-time could allow for such attacks to be identified, resulting in an increased WRI score. Another example of the passive analysis 510 is identification of zero pixel iFRAMEs. Zero pixel iFRAMES are an example of an HTML element that is a common indication of malicious activity on a web page. This element is often used to hide any visual indication of a link, which is used to redirect the victim to an alternate page. While the existence a zero-pixel iFRAME would not by itself definitively identify a malicious web page, it can serve to increase the WRI score for a web request or response.

Yet another example of the passive analysis 510 is the identification of valid or invalid SSL certificates. There is a financial cost associated with obtaining an SSL certificate, especially from a Trusted Root Certificate Authority which attackers are often unwilling to bear. Therefore, the existence of a valid SSL certificate, especially from a Trusted Root Certificate Authority could serve to lower the overall WRI score. Enhanced SSL certificates have both a higher cost and a greater degree of control associated with validating the certificate owner. Therefore, the existence of a valid Enhanced SSL certificate could serve to lower the WRI score to a greater degree than the existence of a standard SSL certificate could lower the WRI score. Conversely, attackers may host malicious content on an SSL enabled site to enhance the appearance of legitimacy as end users tend to mistake secure browser communications with overall site security. The certificates on such sites may be invalid or self-signed. The existence of invalid or self-signed certificates could serve to increase the WRI score. The various passive analysis 510 methods and datasets provided above are example variables that can be components of the overall computation of a WRI score, but still other methods and datasets can also be used.

A third form of analysis that can impact a WRI score is the active analysis 515, which can be performed through additional web requests sent to the server, which houses the destination of the original web request. The active analysis 515 can be performed to identify web risk indicators related to the same web page or other resources housed on that same server. In some implementations the active analysis 515 may be limited to requests deemed appropriate, e.g., by the owners of the servers being analyzed. One of the active analysis 515 methods seeks to identify server side vulnerabilities, which can impact the WRI score. Web sites can be susceptible to a variety of vulnerabilities. While the direct impact of such vulnerabilities may be on the server itself, due to the fact that the vulnerable server may store confidential data related to end users of the system, these end users can indirectly become victims during an attack. The active analysis 515 of sites visited by end users of the system could be used to identify potential vulnerabilities on a site to be visited, which could then influence the overall WRI score for a given request. Such active analysis could occur either in real-time or subsequent to the initial request and the findings could then be leveraged for subsequent requests to the same site. The active analysis 515 would involve queries designed to identify the existence of potentially vulnerable components such as resources with improper access controls, data injection flaws (i.e. SQL injection), information leakage (i.e. authentication credentials included in source code comments), malicious file execution, etc. Resources such as the OWASP Top 10 or Web Application Security Consortium, Threat Classification, detail a variety of web server vulnerabilities which can lead to server compromise and increase the risk level for users accessing resources on that server. Such analysis is commonly referred to as black box testing.

Another of the active analysis 515 methods includes fingerprinting web sites to identify possible malicious web sites or code. For instance, additional requests could be made to the server housing the requested resource in order to determine the technologies being deployed on that server. For example, 'banner grabbing' requests could be made to receive responses which reveal the name and version number of software deployed on the server. Additionally, technologies implementing identical protocols may respond to requests with subtle differences. Such requests could be compared to fingerprinting databases to obtain confidence scores identifying the likely technologies deployed on the server. Once potential technologies are identified, they can be compared against databases of known vulnerabilities to determine if the server in question may be vulnerable to attack. If so, the web risk index score could be increased for web requests or responses transmitted to or from the server in question.

Calculating a weighted average of all appropriate risk indicators as shown below will derive the WRI score:

$$A((X_1+X_2+\ldots+X_n)/n)+B((Y_1+Y_2+\ldots+Y_n)/n)+C((Z_1+Z_2+\ldots+Z_n)/n)$$

where A is the weighting for the third party analysis 505 risk indicators, B is the weighting for the passive analysis 510 risk indicators, and C is the weighting for the active analysis 515 risk indicators. Xn represents the value for the nth risk indicator of third party analysis, $Y_n$ represents the value for the nth risk indicator of passive analysis, and $Z_n$ represents the value for the nth risk indicator of the active analysis. Although the above equation equally weights each of the values (representing a respective risk indicator) within each analysis, it will be appreciated that one or more of the values can be weighted individually. For instance, the value X1 in the third party analysis may be weighted more or less than the remaining values of third party analysis. Additionally, one or more values may be weighted to zero, such that they are not included in the overall WRI score. Thus, it will be appreciated that the WRI score calculation shown above is illustrative and that other equations may be used. In some implementations, WRI scores would not need to be calculated during a request for which a definitive rule was in place, which allowed or disallowed the request outright. As an illustrative example, a rule could be implemented that prohibits any traffic to Site X through, for example, URL filtering controls, such that a WRI score calculation is not be required. Any request to Site X would be denied and there would be no reason to perform a WRI score calculation. Thus, the WRI score is calculated where a rule is not in place to definitively determine is a given request should be allowed or denied.

Referring to FIG. 6, in an exemplary embodiment, an illustrative example of a WRI score calculation is represented by a table 600. The table 600 includes some (but not all) variables described above for the third party analysis, passive analysis, and active analysis. For instance, the WRI score is based on risk identifiers that include the identification of: a domain name in a black list (part of a third party analysis), a recent domain name registration (part of a third party analysis), a zero pixel iFRAME (part of a passive analysis), and a valid SSL Certificate (part of a passive analysis). It will be appreciated that the table 600 is illustrative only, and that one or more other risk indicators described above could have been included in the table 600 as contributing to a WRI score. As shown in the table 600, values for each risk identifier are identified. Although these are represented as positive and negative integer values ranging from −5 to +5, almost any values may be attributed to each risk identifier. Thus, a value of +1, 0, or −1 may alternatively be used to indicate whether a particular risk identifier exists and/or is satisfied. Additionally, in the illustrative example of FIG. 6 a scaling factor may be applied to each value to scale, or weight, the risk indicator. This may be done, for instance, to indicate that the factor is more important than other risk indicators in calculating the WRI score. Here, the WRI score is 9 based on the total WRI score contribution from each weighted value of the risk identifiers.

The WRI score can be compared to one or more predefined and customizable risk threshold would instead be used to determine if the request is permitted. As described below, however, the values for each of the risk indicators (or scaled values for each risk indicator) may be compared against a set of definitive rules that mandate how a web request is handled (e.g., forwarded or blocked) regardless of the WRI score and/or existence and/or values for other risk indicators. For instance, referring to the example table 600 of FIG. 6, a definitive rule may indicate that the existence of a domain name in a black list will automatically result in the blocking of the web request. According to some implementations, WRI scores and/or values for risk indicators (and/or scaled values for risk indicators) may be stored in one or more tables accessible by the web risk service. Upon receipt of a web request the service can perform a lookup in the one or more tables to identify such values, which will prevent the service from having to recalculate or recollect information for a previous request.

Figure 7:
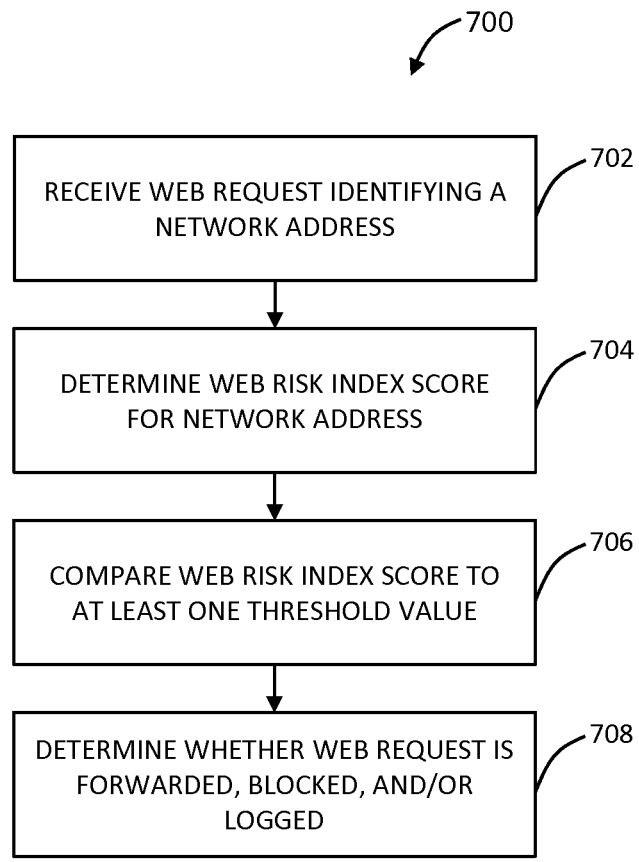
FIG. 7 is a flow chart of a process for identifying and handling web risks such as using the WRI score.

Referring to FIG. 7, in an exemplary embodiment, a flow chart illustrates a process 700 for identifying and handling web risks. The process 700 can, for example, be implemented in a web risk service in one or more of the processing nodes 110 in the system 100 of FIGS. 1 and 2. The steps shown in FIG. 7 are each processes that can be executed independently and concurrently as appropriate. At a step 702 a web request is received from a computer, where the web request identifies a network address. At a step 704, a WRI score is determined for the network address. For instance, the web risk service can calculate the WRI using appropriate risk indicators, such as provided by third party analysis, passive analysis, and active analysis. At a step 706, the WRI score is compared to at least one threshold value. Next, at a step 708, a determination is made based on the comparison whether the web request is forwarded, blocked, and/or logged by the web service. For instance, if the web request's WRI score fails to exceed a first threshold value it may be forward to its destination. If it exceeds the threshold value it may be forwarded but logged. If the WRI score exceeds a second threshold value it may be blocked. This is an illustrative example only, thus it will be appreciated that only a single threshold value may be used to forward or block web requests.

Figure 8:
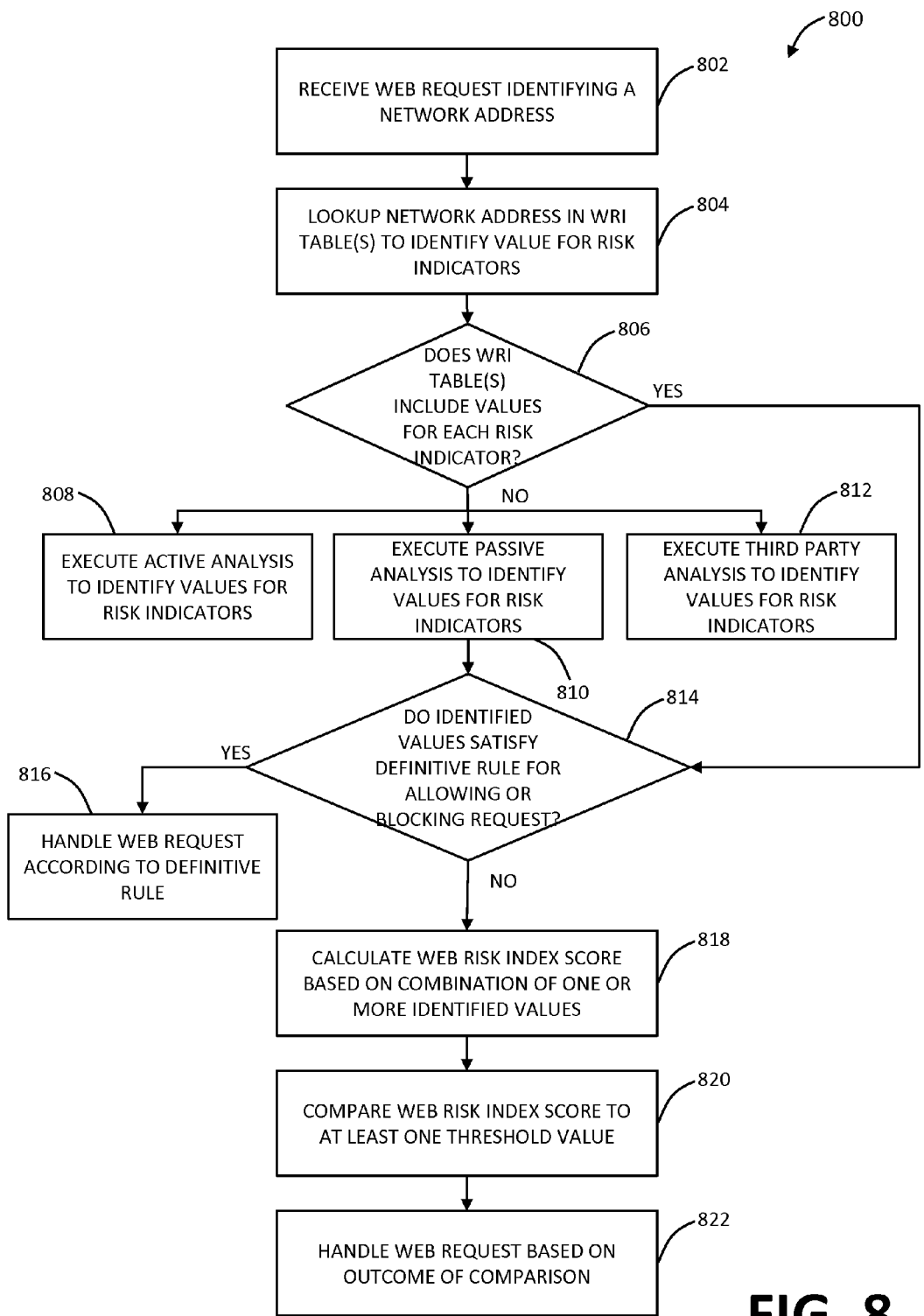
FIG. 8 is a flow chart of an exemplary WRI score calculation and threshold comparison process.

Referring to FIG. 8, in an exemplary embodiment, a flow chart illustrates an exemplary WRI score calculation and threshold comparison process 800. The process 800 can, for example, be implemented in a web risk service in one or more of the processing nodes 110 in the system 100 of FIGS. 1 and 2. The steps shown in FIG. 8 are each processes that can be executed independently and concurrently as appropriate. At a step 802 a web request is received from a user's device, where the web request identifies a network address. At a step 804 a lookup is performed in one or more WRI table(s) to identify values for risk identifiers. For instance, past WRI risk identifiers could be stored and shared among entities that are part of the same system 100, resulting in increased performance and accuracy. Thus, if the WRI table(s) include values for each risk identifier (step 806), the calculation and/or identification of such values is avoided (steps 808, 810, 812). Additionally, although not illustrated in this example, in some implementations, the WRI score for a past web request may be stored and retrieved in a table such that a new WRI score calculation need not occur.

If the WRI table(s) do not include values for each risk identifier (step 806), third party, passive, and active analysis occurs (steps 808, 810, 812) to identify and/or calculate values for risk indicators. Although each of third party, passive, and active analysis are illustrated, one or more of these stages may be eliminated and thus do not have to contribute to the WRI score. Next, at a step 814, it is determined whether any of the identified values satisfy a definitive rule for allowing or blocking the request. For instance, if one of the values satisfies or exceeds a threshold value, then the web request could be allowed or blocked based on that determination alone. A definitive block/allow rule could also be encountered prior to the process defined in FIG. 8, for example when implementing alternate data inspection engines, in which case the entire process could be bypassed altogether. For instance, referring to the example table 600 of FIG. 6, a definitive rule may indicate that the existence of a domain name in a black list will automatically result in the blocking of the web request, regardless of the final WRI score of that web request, and regardless of whether any other risk indicators exist. The definitive rules can be configurable by a system administrator and retrieved for comparison to the identified values. If a definitive rule is applicable, then the web request is handled according to the rule (e.g., allowed or blocked) at a step 816.

At a step 818, a WRI score is calculated based on a combination of the one or more identified values. In some implementations, a weighted average of all risk indicators is used to calculate the WRI score. According to other implementations, each risk indicator may include a scaling factor to increase or decrease an associated impact in calculating the WRI score, as described above with respect to the example of FIG. 6. At a step 820, the WRI score is compared to at least one threshold value. According to some implementations, the at least one threshold value is previously established and stored by the service. Next, at a step 822, the web request is handled based on the comparison. According to some implementations, the web risk service is configured to transmit a status of the web request (e.g., blocked, allowed, warning, logged, etc.) to the computer that transmitted the request. For example, the request could be permitted, blocked, or permitted but logged for later analysis. As an example, if the web request's WRI score fails to exceed a first threshold value it may be forward to its destination. If it exceeds the threshold value it may be forwarded by logged. If the WRI score exceeds a second threshold value it may be blocked. This is an illustrative example only, thus it will be appreciated that only a single threshold value may be used to forward or block web requests.

Figure 9:
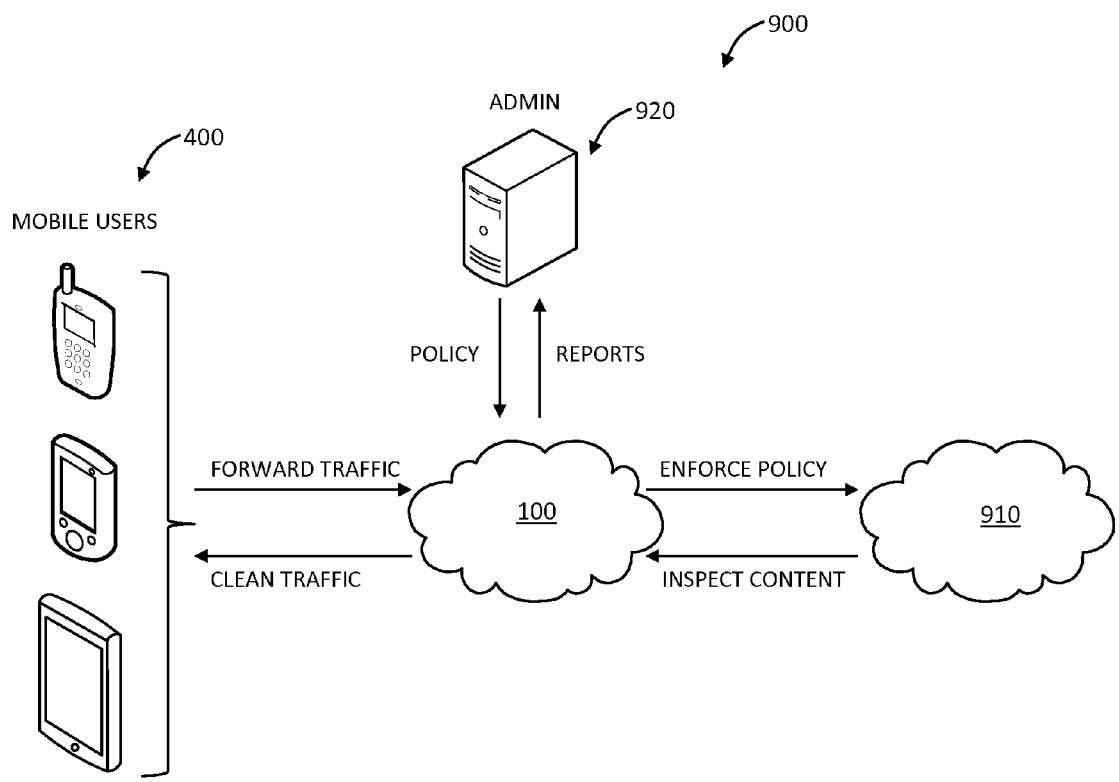
FIG. 9 is a diagram of a network illustrating an exemplary implementation of the present invention with one or more mobile devices communicatively coupled to an external network (e.g., the Internet) via a distributed cloud-based system.

Referring to FIG. 9, in an exemplary embodiment, a network 900 illustrates an exemplary implementation of the present invention with one or more mobile devices 400 communicatively coupled to an external network 910 (e.g., the Internet) via the distributed security system 100. In particular, the mobile devices 400 may include any of the aforementioned mobile devices described herein. The distributed security system 100 (or any other cloud-based system) is configured to provide real-time, continuous inspection of mobile data transactions while not impacting performance. Further, the distributed security system 100 advantageously is platform-independent allowing the mobile devices 400 to be any type of device, platform, operating system, etc. while providing a consistent level of protection. In an exemplary embodiment, the mobile devices 400 are communicatively coupled to the distributed security system 100, such as, for example, via the processing nodes 110. Note, the mobile devices 400 may access the distributed security system 100 via a service provider's wireless network, via a Wi-Fi hotspot, via a wired connection, etc. Each of the mobile devices 400 may include an application, configuration settings, operating system settings, and combinations thereof that configured the mobile device 400 to communicate through to the distributed security system 100.

The distributed security system 100 is configured to act as a gatekeeper with respect to traffic forwarded from the mobile device 400 to the network 910 and for traffic forward from the network 910 to the mobile device 400. In particular, the system 100 is configured to enforce policy guidelines with respect to traffic from the mobile device 400 to the network 910. As described herein, policy refers to a set of use guidelines associated with the mobile device 400. Exemplary policies may include, but not limited to, data usage, time-of-day, location (work vs. off-site), using social networking sites, operating a particular application, black list of web sites, and the like. The system 100 may enforce policy in a variety of ways including blocking non-compliant traffic and displaying a notification on the mobile device 400, alerting an administrator 920, and the like. For example, the administrator 920 of the system 100 may interact with the system 100 to define policy guidelines as well as to receive reports from the system 100 associated with the mobile devices 400. Concurrent with the policy enforcement, the system 100 may also inspect content from the network 910 for malicious content (e.g., malware, spyware, viruses, email spam, etc.) and blocking such content from the mobile device 400.

Thus, the implementation of the network 900 provides a cloud-based security system to the mobile devices 400 that is user, location, and platform independent. There is no requirement for external software on the mobile device 400 other than configuration settings that instruct the mobile device 400 to communicate data through the system 100. In an exemplary embodiment, the mobile device 400 is configured to solely communicate data traffic through the system 100 while voice traffic is handled directly with an end service provider. The network 900 offers a seamless solution that works independent of platform, requires no updates on the mobile device, filtering and policy enforcement is performed in the cloud, etc. In another exemplary embodiment, the network 900 may provide IT administrators an ability to monitor and prevent specific applications on the mobile devices 400. This may prevent unacceptable or risky applications.

The network 900 enforces policy in the cloud, not on the mobile device 400. This means all network content is scanned, both browser and application generated web traffic, to ensure that malicious content is blocked in the cloud—long before it reaches the mobile device 400, or the corporate network. Unlike other mobile security solutions that require platform-specific applications to be installed on every device, the present invention works seamlessly across mobile platforms, including iPhones, iPads, and Android devices, for example. Advantageously, the present invention requires no signature updates on the mobile device 400 and provides real-time inspection in the cloud for every web or data transaction, regardless of whether it came from a browser or from an application installed on the device. Further, the present invention runs in the cloud and has no impact on the mobile device's performance, battery life, or processing resources. Also, the system 100 may provide real-time logs and reports for any user, from any location, on any device, at any time.

Figure 10:
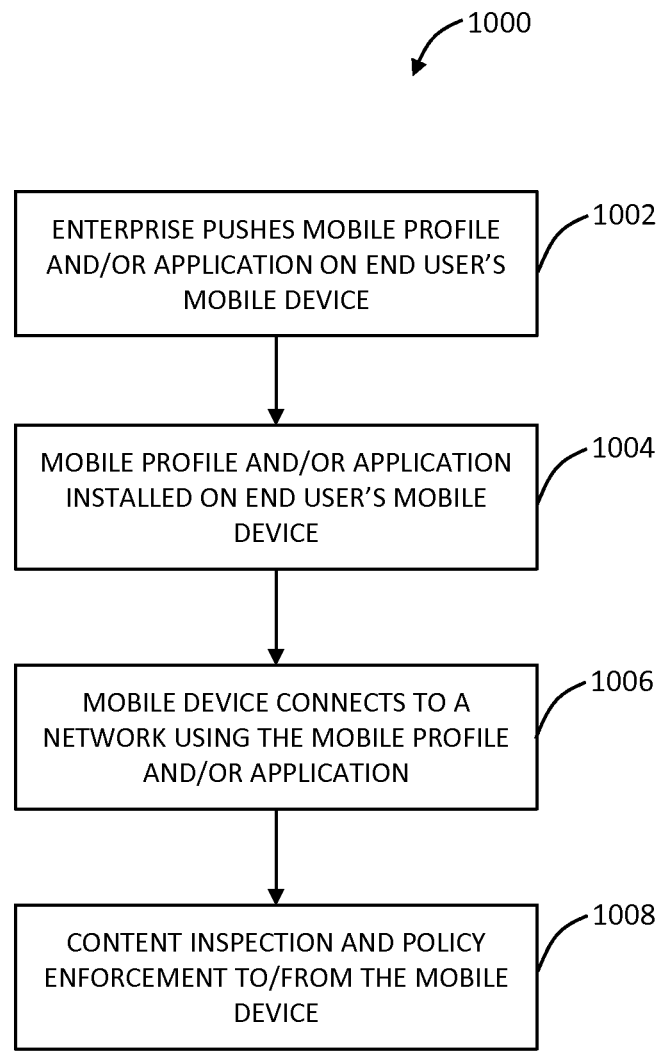
FIG. 10 is a flow chart of a mobile device use method for using a cloud-based security system with a mobile device.

Referring to FIG. 10, in an exemplary embodiment, a flow chart illustrates a mobile device use method 1000 for using a cloud-based security system with a mobile device. The method 1000 may, for example, be implemented in the network 900 such as through the mobile device 400 and the system 100 (or alternatively any cloud-based system). The steps shown in FIG. 10 are each processes that can be executed independently and concurrently as appropriate. First, an enterprise or the like pushes a mobile profile and/or application on an end user's mobile device (step 1002). In an exemplary embodiment, the push includes pushing configuration settings on the mobile device such that data traffic flows through the cloud-based security system. This may include a Hypertext Transfer Protocol (HTTP) Proxy, a VPN between the mobile device and the cloud-based system, from devices in a carrier or service provider's network to the cloud-based system, from a Wi-Fi network to the cloud-based system, etc. For example, a specific operating system associated with the mobile device 400 may natively support such configurations. Alternatively, an application may be pushed on to the mobile device 400 to provide such a connection to the cloud-based security system. The mobile profile and/or the application is installed on the end user's mobile device (step 1004). Once installed, the mobile device is configured to connect to a network using the mobile profile and/or the application (step 1006). Here, the mobile device is configured such that data communication (e.g., web, email, etc.) is through the cloud-based security system. The cloud-based security system is configured to provide content inspection and policy enforcement (step 1008).

Figure 11:
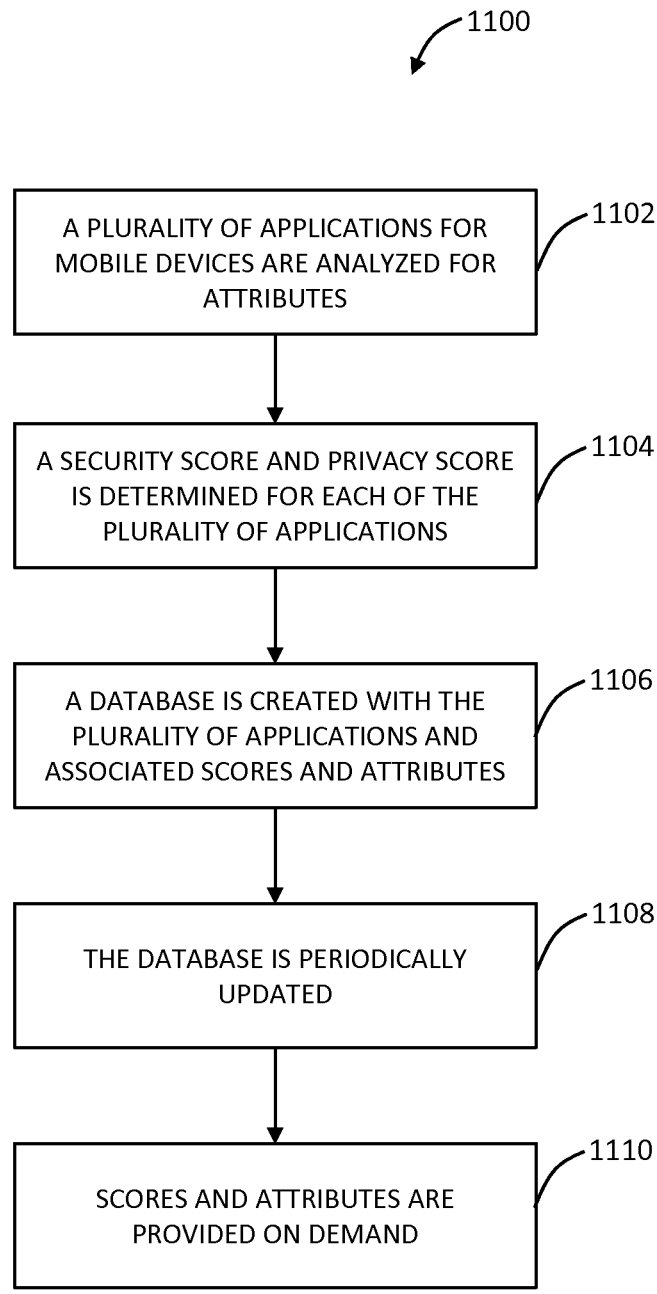
FIG. 11 is a flow chart of a mobile application classification method for classifying applications associated with mobile devices.

Referring to FIG. 11, in an exemplary embodiment, a flow chart illustrates a mobile application classification method 1100 for classifying applications associated with mobile devices. The method 1100 may, for example, be implemented in the network 900 such as through the mobile device 400 and the system 100 (or alternatively any cloud-based system) or on a device, such as the server 300 communicatively coupled to the network 900. The steps shown in FIG. 11 are each processes that can be executed independently and concurrently as appropriate. The method 1100 may be utilized for classifying applications based on their security and privacy profile and leveraging the associated data to provide protection and policy enforcement for applications by leveraging the cloud. First, a plurality of applications for mobile devices is analyzed for various attributes (step 1102). The applications may include mobile applications on Apple's App Store, Google's Android Market, and the like. Exemplary attributes may include application creator, category, user-agent strings used by the application to communicate over the network, security attributes, privacy attributes, and the like. The purpose of the method 1100 is to classify each application with an associated score defining risk. For example, in one exemplary embodiment, the method 1100 may determine a security score and a privacy score for each of the plurality of applications (step 1104). These scores may take any form (numerical, alphabetical, etc.). For example, the scores may be based on a numerical range, e.g. 1-10 where 1 is very secure and 10 is very insecure. These scores may define a mobile Application Security Rating (ASR).

In an exemplary embodiment, the security score may be computed based on 1) a security analysis done for the application, 2) application permissions which determine what the application is capable of accessing, 3) reputation of the vendor that created the application, 4) feedback from users, 5) real-time analysis of app behavior in the cloud, and 6) combinations thereof. In an exemplary embodiment, the privacy score may be based on 1) a privacy analysis done for the application, 2) feedback from users of the application around security, 3) real-time analysis of app behavior in the cloud, and 4) combinations thereof. With this data, a database may be created with the plurality of applications and their associated scores and attributes (step 1106). For example, the database may be at a server 300 in the cloud-based system, such as at a processing node 110, at an authority node 120, or combinations thereof. This database may be continually or periodically updated (step 1108). For example, the database may be updated as new applications emerge, as new ratings are determined based on the cloud-based system, etc. Further, the method 1100 is configured to provide the scores and the attributes on demand as required by the cloud-based system (step 1110). For example, the cloud-based system may utilize this data in a policy enforcement step, i.e. is a particular application requested by a mobile device allowed per policy, does it meet a minimum threshold for security and/or privacy, will this application interfere with an enterprise network, etc. Note, the method 1100 is similar to the web risk index described herein, and may utilize a similar determination method.

Figure 12:
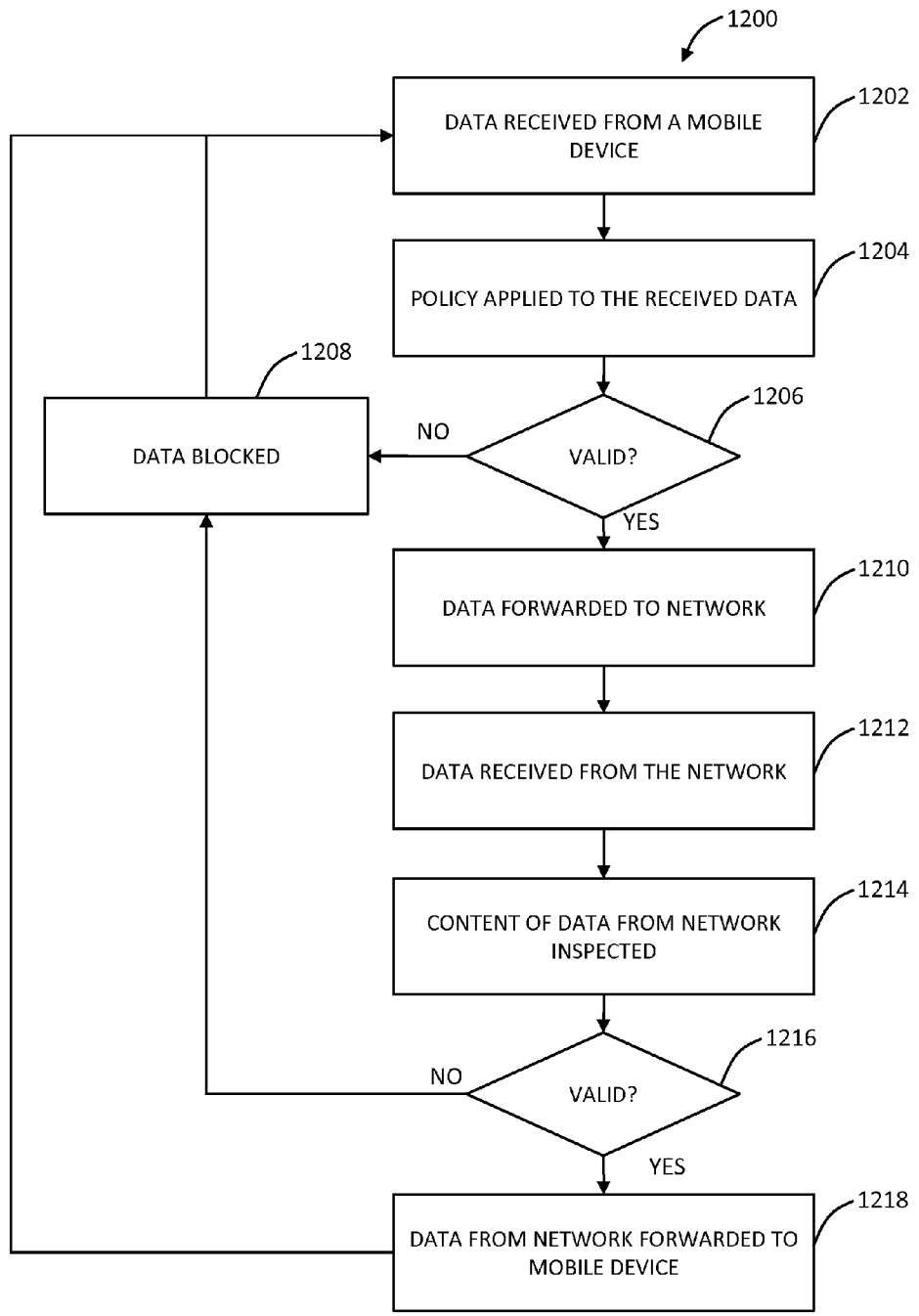
FIG. 12 is a flow chart of a mobile device security method using a cloud-based security system with a mobile device.

Referring to FIG. 12, in an exemplary embodiment, a flow chart illustrates a mobile device security method 1200 using a cloud-based security system with a mobile device. The method 1200 may, for example, be implemented by a cloud-based system such as in the network 900 through the mobile device 400 and the system 100 (or alternatively any cloud-based system). The steps shown in FIG. 12 are each processes that can be executed independently and concurrently as appropriate. The method 1200 assumes the mobile device is configured to operate with the cloud-based system (such as through the method 1000). A cloud-based system receives data from a mobile device (step 1202). As described herein, the mobile device is configured to communicate data traffic through the cloud-based security system. The data may include Web traffic and the like. In an exemplary embodiment, the data may be forwarded to the cloud-based system through a variety of mechanisms such as, for example, a Hypertext Transfer Protocol (HTTP) Proxy, a VPN between the mobile device and the cloud-based system, from devices in a carrier or service provider's network to the cloud-based system, from a Wi-Fi network to the cloud-based system, etc. For example, related to a carrier or service provider's network, a user of the mobile device may access a wireless network, e.g. a 3G/4G network from any of AT&T, Verizon, Sprint, T-Mobile, etc. In this embodiment, the cloud-based system may be configured to directly receive data from the mobile device without requiring an HTTP proxy, VPN, etc.

The cloud-based system is configured to analyze data from the mobile device to apply predefined policy (step 1204). As described herein, policy may be broadly defined as any acceptable-use activity defined by an IT administrator, etc. For example, the acceptable-use activity may include blocking use and/or installation of applications based on the mobile Application Security Rating, preventing access to black listed Web sites, data use during specified times (e.g., at work), and the like. The administrator can define policies that block applications based on Application Security Rating, category, vendor, etc. In another exemplary embodiment, the data may include a Web request and the cloud-based system may implement the Web Risk Index described herein to determine whether or not to forward such request. Policies may be defined for a company, group or user. Appropriate application policies are enforced inline. For example, applications that are deemed malicious or violating policy can be prevented from being downloaded by the secure web gateway. That is, if the cloud-based system deems the data from the mobile device violates a policy (step 1206), the data may be blocked (step 1208). In an exemplary embodiment, the data may be blocked and a message may be provided to the mobile device notifying a user as such.

If the data does not violate a policy (step 1206), the cloud-based system may forward the data to an external network (step 1210). For example, the cloud-based system may forward the data to the Internet including a designated Web site. Subsequently, the cloud-base system may receive a data response from the network for the mobile device based on the initially forwarded data (step 1212). Upon receipt of the data response, the cloud-based system is configured to inspect the content of the data response (step 1214). Here, the cloud-based system is configured to provide real-time traffic analysis and enforcement in the cloud. As described herein, the system 100 may provide a secure gateway to view all data transactions in real-time and provide content inspection with respect to malicious content including, but not limited to, viruses, spyware, malware, Trojans, botnets, spam email, phishing content, inappropriate content with respect to policy, black listed content, and the like. In particular, the cloud-based system is configured to determine if the content is valid and/or capable of being forwarded to the mobile device (step 1216). If the cloud-based system determines for some reason (e.g., malicious content, unapproved application, risky content from a security or privacy perspective, policy violation, etc.), the cloud-based system may block the data from the mobile device (step 1208) and potentially notify the user and/or the IT administrator. Alternatively, if the data response is clean and not in violation of any defined policy, the data response from the network may be forwarded to the mobile device by the cloud-based system (step 1218).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method, comprising:
 configuring a mobile device such that the mobile device communicates data to an external network via a cloud-based security system;
 receiving data from the mobile device;
 enforcing policy on the data from the mobile device;
 based on the policy, forwarding the data to the external network;
 receiving data from the external network;
 inspecting content of the data from the external network;
 based on the inspecting content, forwarding the data to the mobile device;
 determining and storing, in a database, a plurality of attributes for each of a plurality of applications for the mobile device and periodically updating the database, wherein the determining the plurality of attributes comprises determining a security score based on a plurality of factors related to security, and determining a privacy score based on a plurality of factors related to privacy; and
 utilizing the database in the enforcing policy step to prevent the data from the mobile device from being forwarding if the data relates to an application which does not meet a minimum threshold related to the security score and the privacy score.

2. The method of claim 1, further comprising:
 utilizing the database in the enforcing policy step.

3. The method of claim 1, further comprising:
 for a particular application, updating the plurality of attributes based on feedback from the cloud-based security system.

4. The method of claim 1, further comprising:
 determining a web risk index based on either the data from the mobile device or the data from the external network; and
 based on the web risk index, forwarding the data from the mobile device to the external network or forwarding the data from the external network to the mobile device.

5. The method of claim 1, further comprising:
 pushing a configuration to the mobile device prior to the configuring step.

6. The method of claim 1, wherein the configuring step comprises setting the mobile device such that data to and from the mobile device is interfaced through the cloud-based security system.

7. The method of claim 6, wherein the mobile device is configured with a Hypertext Transfer Protocol proxy designating the cloud-based security system.

8. The method of claim 6, wherein the mobile device is configured with a Virtual Private Network to the cloud-based security system.

9. The method of claim 1, wherein the inspecting content step comprises analyzing the data from the external network for malicious content.

10. The method of claim 9, wherein the malicious content comprises viruses, spyware, malware, Trojans, botnets, spam email, phishing content, inappropriate content with respect to policy, black listed content, and combinations thereof.

11. A network security system, comprising:
- a processing node communicatively coupled to a mobile device and to an external network, wherein the processing node comprises a data store storing security policy data for the mobile device, data inspection engines configured to perform threat detection classification on content to the mobile device from the external network, and a manager communicatively coupled to the data store and the data inspection engines;
- wherein the processing node is configured to enforce policy between the mobile device and the external network and inspect content from the external network to the mobile device through the steps of:
- receiving data from the mobile device;
- enforcing policy on the data from the mobile device;
- based on the policy, forwarding the data to the external network;
- receiving data from the external network;
- inspecting content of the data from the external network;
- based on the inspecting content, forwarding the data to the mobile device;
- determining and storing, in the data store, a plurality of attributes for each of a plurality applications for the mobile device and periodically updating the data store, wherein the determining the plurality of attributes comprises determining a security score based on a plurality of factors related to security, and determining a privacy score based on a plurality of factors related to privacy; and
- utilizing the data store in the enforcing policy step to prevent the data from the mobile device from being forwarding if the data relates to an application which does not meet a minimum threshold related to the security score and the privacy score.

12. The network security system of claim 11, further comprising:
- an authority node communicatively coupled to the processing node, wherein the authority node comprises a data store storing security policy data for the processing node and a plurality of other processing nodes;
- wherein the authority node is configured to maintain a database of application ratings for a plurality of applications associated with the mobile device, and wherein the database is utilized by the processing node to enforce the policy and to inspect the content.

13. The network security system of claim 11, wherein the mobile device is configured with a Hypertext Transfer Protocol proxy designating the processing node.

14. The network security system of claim 11, wherein the mobile device is configured with a Virtual Private Network to the processing node.

15. A server, comprising:
- a data store;
- a network interface communicatively coupled to a network;
- a processor, wherein the data store, the network interface, and the processor are communicatively coupled there between and configured to:
- receive data from a mobile device;
- enforce policy on the data from the mobile device;
- based on the policy, forward the data to the external network;
- receive data from the external network;
- inspect content of the data from the external network;
- based on the inspected content, forward the data to the mobile device;
- determine and store, in the data store, a plurality of attributes for each of a plurality of applications for the mobile device and periodically update the data store, wherein to determine the plurality of attributes comprises determining a security score based on a plurality of factors related to security, and determining a privacy score based on a plurality of factors related to privacy; and
- utilize the data store in the enforce policy step to prevent the data from the mobile device from being forwarding if the data relates to an application which does not meet a minimum threshold related to the security score and the privacy score.

* * * * *